United States Patent [19]

Reimann

[11] Patent Number: 5,200,484
[45] Date of Patent: Apr. 6, 1993

[54] TERPOLYMERS OF ETHYLENE, THEIR PREPARATION AND THEIR USE AS ADDITIVES FOR MINERAL OIL DISTILLATES

[75] Inventor: Werner Reimann, Duisburg, Fed. Rep. of Germany

[73] Assignee: Hoechst Atkiengesellschaft, Fed. Rep. of Germany

[21] Appl. No.: 716,949

[22] Filed: Jun. 18, 1991

[30] Foreign Application Priority Data

Jun. 29, 1990 [DE] Fed. Rep. of Germany ....... 4020640

[51] Int. Cl.$^5$ ............................................. C08F 218/08
[52] U.S. Cl. ..................................................... 526/331
[58] Field of Search ......................................... 526/331

[56] References Cited

U.S. PATENT DOCUMENTS

| | | | |
|---|---|---|---|
| 3,159,608 | 12/1964 | Ilnyckyi | 526/331 |
| 3,640,836 | 2/1972 | Oberst et al. | 526/331 |
| 3,976,631 | 8/1976 | van der Molen et al. | 526/331 |
| 3,981,850 | 9/1976 | Wisotsky et al. | 526/331 |
| 4,035,329 | 7/1977 | Wiest et al. | 526/331 |
| 4,164,489 | 8/1979 | Dainels et al. | 526/331 |

FOREIGN PATENT DOCUMENTS

| | | | |
|---|---|---|---|
| 0099646 | 2/1984 | European Pat. Off. | 526/331 |
| 111883 | 6/1984 | European Pat. Off. | |
| 0184048 | 6/1986 | European Pat. Off. | 526/331 |
| 271738 | 6/1988 | European Pat. Off. | |
| 360419 | 3/1990 | European Pat. Off. | |
| 1267429 | 5/1968 | Fed. Rep. of Germany | 526/331 |
| 2437490 | 2/1976 | Fed. Rep. of Germany | 526/331 |
| 3443475 | 5/1986 | Fed. Rep. of Germany | 526/331 |
| 4533063 | 10/1970 | Japan | 526/331 |
| 55-129469 | 10/1980 | Japan | 526/331 |
| 715913 | 9/1954 | United Kingdom | 526/331 |
| 843974 | 8/1960 | United Kingdom | 526/331 |
| 915890 | 1/1963 | United Kingdom | 526/331 |
| 1217449 | 12/1970 | United Kingdom | 526/331 |
| 1233837 | 6/1971 | United Kingdom | 526/331 |

*Primary Examiner*—Joseph L. Schofer
*Assistant Examiner*—N. Sarofin
*Attorney, Agent, or Firm*—Bierman and Muserlian

[57] ABSTRACT

Terpolymers obtained by polymerizing a mixture of ethylene, vinyl acetate, and isobutyl vinyl ether, a process for their preparation, and methods of their use as additives for mineral oil distillates.

3 Claims, No Drawings

TERPOLYMERS OF ETHYLENE, THEIR PREPARATION AND THEIR USE AS ADDITIVES FOR MINERAL OIL DISTILLATES

The present invention relates to terpolymers of ethylene, vinyl acetate, and isobutyl vinyl ether, having a mean molecular weight $\overline{M}_n$ of 500 to 5,000 g/mol. They can be used successfully for improving the flow of mineral oils and mineral oil distillates.

BACKGROUND OF THE INVENTION

Crude oils, and middle distillates obtained by distillation of crude oils, such as gas oil, diesel oil, or fuel oil, contain various amounts of long-chain paraffins (waxes) depending on their origin. At low temperatures, these paraffins separate out as tabular crystals, some with inclusion of oil. This has a substantial adverse effect on the flow of the oils and the distillates obtained from them. Solid deposits occur and frequently lead to problems in the production, transportation, and use of mineral oil products. Thus, in the cold season, blockage of the filters occurs, for example in diesel engines and furnaces, which prevents reliable metering of the fuels and finally results in complete interruption of the motor fuel or heating agent feed. The transportation of middle distillates through pipelines over large distances in winter can also be adversely affected by the precipitation of paraffin crystals.

It is known that undesirable crystal growth can be inhibited by suitable additives and hence an increase in the viscosity of the oils prevented. These additives, known as pour point depressants or flow improvers, achieve these results of changing the size and shape of the wax crystals formed. The flow behavior and low-temperature behavior of mineral oils and mineral oil distillates are described by the pour point (according to DIN 51 597) and the cold filter plugging point (CFPP, according to DIN 51 428). Both parameters are measured in °C.

Typical flow improvers for crude oil and middle distillates are copolymers of ethylene with carboxylates of vinyl alcohol. Thus, according to DE 11 47 799 B1, oil soluble copolymers of ethylene and vinyl acetate having molecular weights between about 1,000 and 3,000 are added to motor fuels or heating fuels derived from mineral oil distillates having a boiling range between about 120° and about 400° C. Copolymers which contain about 60% to about 99% by weight of ethylene and about 1% to about 40% by weight of vinyl acetate have proven particularly suitable.

It is also known that copolymers of the stated qualitative composition which have been prepared by free radical polymerization in an inert solvent at temperatures of about 70° to about 130° C. and pressures of 35 to 2,100 atmospheres gauge are particularly effective (DE 19 14 756 B2).

DE 21 02 469 C2 relates to the use of ethylene copolymers having a molecular weight of 500 to 4,500 and a comonomer content of 30% to 75% by weight. They are obtained by polymerizing ethylene with vinyl esters of 4 to 10 carbon atoms, and with acrylates and methacrylates which are derived from alcohols having 1 to 12 carbon atoms, together in the absence of solvents and emulsifiers.

The efficiency of the known additives for improving the properties of mineral oil fractions is dependent on their composition and hence on the origin of the mineral oil from which they have been obtained. Additives which are outstandingly suitable for favorably influencing the properties of fractions of one crude oil may lead to completely unsatisfactory results in distillates of crude oils of a different origin.

For economic reasons, it is of interest to increase the yield of middle distillate heating fuels and motor fuels. One method for achieving this is the addition of relatively large amounts of heavy gas oil thereto. Another possibility for improving the middle distillate yield is to widen the boiling range, i.e. to separate off middle distillate fractions whose final boiling point is above 370° C. Both methods result in an increase in the higher molecular weight n-paraffin content. The known additives, such as copolymers of ethylene and vinyl acetate, provide only an unsatisfactory improvement in flow in middle distillate fractions having a final boiling point above 370° C.

SUMMARY OF THE INVENTION

It is therefore the object of the invention to provide additives having a wide range of applications. They should improve the flow both of distillates of crude oils of different origins and of mineral oil fractions having a final boiling point above 370° C.

The invention relates to terpolymers which, in addition to ethylene units, contain 5 to 20 mol % of vinyl acetate units and 0.2 to 5 mol % of isobutyl vinyl ether units and have a mean molecular weight ($\overline{M}_n$) of 500 to 5,000 g/mol. The invention further relates to the use of the terpolymers described above for improving the flow of mineral oil distillates. Surprisingly, the terpolymers of the invention have proven excellent for this purpose. Their wide applicability, i.e. their efficiency in mineral oil distillates of different origin, different compositions, and different boiling behavior, is particularly noteworthy.

The novel terpolymers can, in principle, be used as flow improvers both in crude oils and in crude oil products intended for further processing and obtained by distillation. However, they are preferably used in mineral oil distillates, in particular mineral oil middle distillates. These are understood as meaning hydrocarbon fractions which boil between 150° and 400° C. Examples of such crude oil distillates are petroleum, light fuel oils, and diesel fuel. Middle distillates, such as extra-light fuel oil and diesel fuel, are of particular importance.

DETAILED DESCRIPTION OF THE INVENTION

Terpolymers which, in addition to ethylene, contain 7 to 15 mol % of vinyl acetate units and 0.5 to 2 mol % of butyl vinyl ether units have proven particularly suitable as flow improvers. In addition to the composition, an essential criterion of the novel terpolymers is the mean molecular weight ($\overline{M}_n$). It is 500 to 5,000 g/mol, as measured in a vapor phase osmometer using toluene as a solvent. Terpolymers having a mean molecular weight of 1,000 to 3,000 g/mol are preferably used as flow improvers. The melt viscosity of the novel terpolymers, measured at 140° C., is 25 to 500 mPa.s and particularly suitable flow improvers are terpolymers having a melt viscosity (at 140° C.) of 50 to 300 mPa.s.

For the preparation of the terpolymers according to the invention from ethylene, isobutyl vinyl ether, and vinyl acetate, mixtures of the monomers are used as starting materials. Isobutyl vinyl ether is a colorless liquid which boils at 83° C. It is obtained, for example, by reacting ethylene with isobutyl alcohol in the presence of a catalyst which comprises a noble metal of Group VIII of the Periodic Table of the Elements (IUPAC version) in a redox system (U.S. Pat. No. 4,057,575).

The starting materials are polymerized by known processes (cf. for example Ullmanns Encyclopadie der Technischen Chemie [Ullmann's Encyclopedia of Industrial Chemistry], 4th Edition, Vol. 19, pages 169 to 178) in the presence of initiators such as oxygen, peroxides, hydroperoxides or azo compounds. The reaction of the monomers is carried out at pressures between 50 and 700 MPa and at temperatures between 100° and 350° C. Pressures of 150 to 300 MPa and temperatures between 120° and 325° C. are preferred. The mean molecular weight $\overline{M}_n$ of the terpolymers is obtained by varying the reaction parameters of pressure and temperature for a given composition of the monomer mixture and by adding a molecular weight regulator. Molecular weight regulators which have proven suitable are, for example, saturated or unsaturated hydrocarbons, aldehydes or ketones. They are used in an amount of 0.05% to 10% by weight, based on the monomer mixture. A particularly suitable molecular weight regulator is propionaldehyde.

In order to obtain polymers having the claimed composition, monomer mixtures which contain, in addition to ethylene, 5 to 20 mol % of vinyl acetate and 0.6 to 15 mol % of isobutyl vinyl ether are used. The different polymerization rates of the monomers are taken into account by virtue of the fact that the isobutyl vinyl ether content of the monomer mixture is higher than that of the terpolymer. The polymers are obtained as colorless melts which solidify to waxy solids at room temperature.

The polymerization is carried out in known high pressure reactors, for example autoclaves or tube reactors. Solvents, such as aliphatic hydrocarbons or hydrocarbon mixtures, benzene or toluene, may be present in the reaction mixture, although the solvent-free procedure has proven particularly useful. The polymerization is preferably carried out in tube reactors.

The terpolymers according to the invention are added to mineral oil distillates in the form of solutions which contain 40 to 60% by weight (based on the solution) of terpolymer. Suitable solvents are aliphatic or aromatic hydrocarbons or hydrocarbon mixtures, for example gasoline fractions and in particular kerosene. Mineral oil distillates whose rheological properties have been improved by the novel polymeric compounds contain 0.001% to 2%, preferably 0.005% to 0.5% by weight, based on the distillate, of terpolymer. The terpolymer can be used alone or together with other additives, for example with dewaxing agents, corrosion inhibitors, antioxidants or sludge inhibitors. It is also possible to use mixtures of the terpolymers according to the invention whose components differ in respect of their compositions and/or their mean molecular weights.

The preparation of the novel terpolymers and their properties are described in Examples 1 to 3. Further Examples A to C are directed to the use of the novel terpolymers as additives for mineral oil distillates. The Examples merely illustrate the invention but do not restrict.

EXAMPLES 1 to 3

Preparation of ethylene/vinyl acetate/isobutyl vinyl ether terpolymers.

Ethylene, vinyl acetate, and isobutyl vinyl ether are polymerized in an autoclave, with the addition of propionaldehyde as a molecular weight regulator. For this purpose, the monomer mixture to which bis-(2-ethylhexyl) peroxydicarbonate (EHP) dissolved in mineral spirits (0.5% by weight of EHP in the solvent) is added as an initiator is fed into the reactor at the reaction pressure. The residence time of the reactants in the autoclave is about 50 to 150 sec.

In Table 1 below, the polymerization conditions and the properties of the resulting terpolymers are summarized. The vinyl acetate content of the terpolymers is determined by the pyrolysis method. For this purpose, 200 mg of the polymer are heated with 300 mg of pure polyethylene in a pyrolysis flask for 5 minutes at 450° C. and the cleavage gases are collected in a 250 ml round-bottomed flask. The acetic acid formed is reacted with NaI/KIO$_3$ solution and the liberated iodine is titrated with Na$_2$S$_2$O$_3$ solution. The isobutyl vinyl ether content is determined by H-NMR spectroscopy. The viscosity is measured at 140° C. using a Rotovisco System MV II (manufacturer: Haake, Karlsruhe).

TABLE 1

Preparation of ethylene/vinyl acetate/isobutyl vinyl ether terpolymers

| Example No. | | 1 | 2 | 3 |
|---|---|---|---|---|
| Pressure | (MPa) | 200 | 200 | 200 |
| Temperature | (°C.) | 160 | 160 | 160 |
| Ethylene | (kg/h) | 8.0 | 8.0 | 8.0 |
| Vinyl acetate | (kg/h) | 3.56 | 3.17 | 3.87 |
| Isobutyl vinyl ether | (kg/h) | 0.60 | 0.58 | 0.62 |
| Initiator | Type | EHP | EHP | EHP |
| | Amount (ml/h) | 290 | 280 | 320 |
| Regulator | Type | Propionaldehyde | Propionaldehyde | Propionaldehyde |
| | Amount (ml/h) | 320 | 310 | 350 |
| Polymer discharge | (kg/h) | 1.25 | 1.14 | 1.37 |
| Vinyl acetate content | (mol %) | 12.11 | 10.98 | 13.61 |
| Isobutyl vinyl ether content | (mol %) | 0.60 | 0.60 | 0.61 |
| Melt viscosity 140° C. | (mPa) | 230 | 260 | 250 |
| Molecular weight $\underline{M}_n$ | (g · mol$^{-1}$) | 1851 | 1880 | 1985 |

EXAMPLES A-D

The efficiency of the ethylene/vinyl acetate/isobutyl vinyl ether terpolymers as mineral oil additives in comparison with an ethylene/vinyl acetate copolymer.

The efficiency of the ethylene/vinyl acetate/isobutyl vinyl ether terpolymers obtained in Examples 1 to 3 as additives for mineral oils and mineral oil distillates is described in Examples A-C (Table 3) with reference to the CFPP (cold filter plugging point) test. As a comparison, the efficiency of a commerical ethylene/vinyl acetate copolymer is described in Example D. This copolymer contains 12.1 mol % of vinyl acetate and has a melt viscosity (at 140° C.) of 290 mPa.s and a mean raw molecular weight of 1995. The test is carried out according to DIN 51 428; it has also been published in J. of the Inst. of Petr., Vol. 52, Jun. 1966, pages 173 to 185.

Three middle distillates M1, M2 and M3 which are characterized by the properties summarized in Table 2 are used for the test. The results of Examples A to D show that the terpolymers according to the invention have a substantially improved efficiency in middle distillate fractions having a high final boiling point compared with conventional ethylene/vinyl acetate copolymers. Furthermore, the terpolymers according to the invention are noticeably more effective than the known additives, even when used in small amounts.

TABLE 2

Characteristics of the middle distillates

| | M1 | M2 | M3 |
|---|---|---|---|
| 1. Distillation analysis (according to ASTM D 86; °C.) | | | |
| Initial boiling point | 184 | 177 | 176 |
| 20% by volume | 217 | 243 | 221 |
| 50% by volume | 258 | 282 | 265 |
| 90% by volume | 350 | 338 | 356 |
| Final boiling point | 377 | 360 | 381 |
| 2. CP (°C.) | +1 | −2 | +1 |
| 3. CFPP (°C.) | −4 | −6 | −5 |

TABLE 3

| Example | Polymer from Example | Concentration (ppm) | CFPP° C. M1 | M2 | M3 |
|---|---|---|---|---|---|
| A | 1 | 0 | −4 | −6 | −5 |
| | | 100 | −10 | — | −9 |
| | | 150 | −13 | — | — |
| | | 200 | — | — | — |
| | | 500 | — | — | −16 |
| | | 750 | — | −9 | — |
| B | 2 | 0 | −4 | −6 | −5 |
| | | 100 | −9 | — | −9 |
| | | 150 | −13 | — | — |
| | | 200 | — | — | — |
| | | 500 | — | — | −17 |
| | | 750 | — | −9 | — |
| C | 3 | 0 | −4 | −6 | −5 |
| | | 100 | −12 | — | −11 |
| | | 150 | −14 | — | — |
| | | 200 | — | — | — |
| | | 500 | — | — | −18 |
| | | 750 | — | −8 | — |
| D | Copolymer | 0 | −4 | −6 | −5 |
| | | 100 | −8 | — | −6 |
| | | 150 | −13 | — | — |
| | | 200 | — | — | — |
| | | 500 | — | — | −8 |
| | | 750 | — | −8 | — |

What we claim is:

1. A terpolymer from a mixture of monomers comprising ethylene, 5 to 20 mol % of vinyl acetate, and 0.2 to 5 mol % of isobutyl vinyl ether, said terpolymer having a mean molecular weight ($M_n$) of 500 to 5000 g/mol.

2. The terpolymer of claim 1 comprising 7 to 15 mol % of said vinyl acetate and 0.5 to 2 mol % of said isobutyl vinyl ether.

3. The terpolymer of claim 1 wherein said mean molecular weight is 1000 to 3000 g/mol.

* * * * *